J. A. NOLAN.
SAFETY DEVICE FOR MINES.
APPLICATION FILED MAY 2, 1918.
1,293,519.
Patented Feb. 4, 1919.
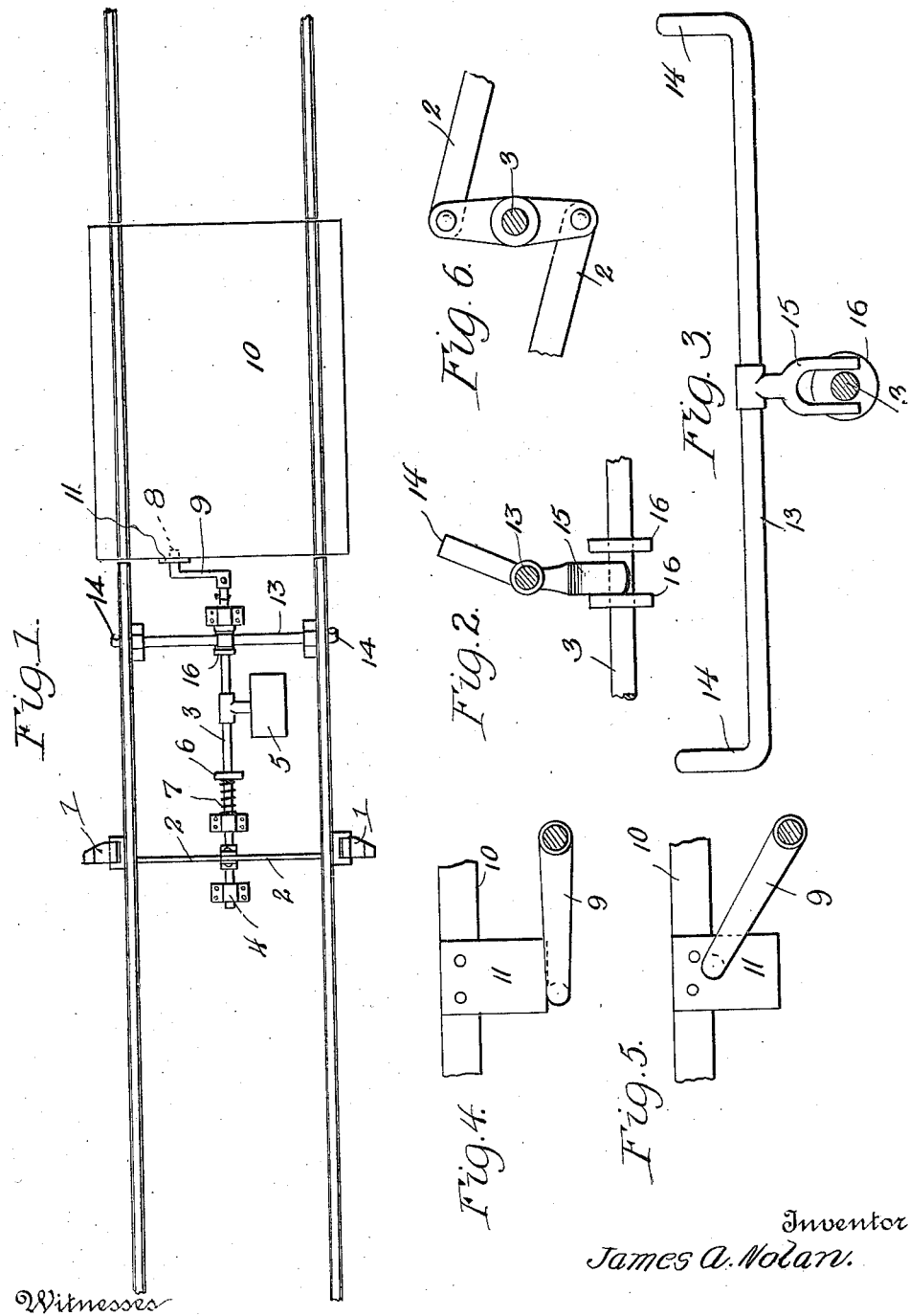
Inventor
James A. Nolan.
By Victor J. Evans
Attorney

UNITED STATES PATENT OFFICE.

JAMES A. NOLAN, OF BOWERSTON, OHIO.

SAFETY DEVICE FOR MINES.

1,293,519.   Specification of Letters Patent.   Patented Feb. 4, 1919.

Application filed May 2, 1918. Serial No. 232,098.

*To all whom it may concern:*

Be it known that I, JAMES A. NOLAN, a citizen of the United States, residing at Bowerston, in the county of Harrison and State of Ohio, have invented new and useful Improvements in Safety Devices for Mines, of which the following is a specification.

This invention relates to a safety apparatus for mines and more particularly to a car feeding apparatus and has for its primary object to provide an apparatus of a construction having a relatively small number of parts.

An object of the invention is to provide mechanism in which the parts are so associated that it is only necessary to use a single pair of stops.

Besides the above my invention is distinguished in cage operated means for controlling the cars passing onto the cage and car operated means for arranging the apparatus so that the cage will not operate the same.

With these and other objects in view the invention will be better understood from the following detailed description taken in connection with the accompanying drawing wherein;

Figure 1 is a top plan view of the apparatus showing the stops thrown to an open position.

Figs. 2 and 3 are detailed views of the actuator.

Fig. 4 is a view of the crank arm shown engaged by the cage plate.

Fig. 5 is a similar view showing the crank arm in a position engaging the side of the cage plate.

Fig. 6 is a view of a portion of the link mechanism operating the stops.

The particular form of my invention illustrated in the drawing consists of a pair of stops 1 mounted for pivotal movement so arranged in closed position as to engage the wheels of a car and in open position to release said wheels. These stops 1 are connected by link mechanism 2 with a shaft 3. This shaft 3 is mounted in bearings 4 in a manner to allow longitudinal movement of the shaft as well as rotatable movement. Fixed upon the shaft 3 is a weight 5 and a collar 6. Arranged between one of the bearings 4 and the collar 6 is a spring 7 for normally forcing the shaft 3 in a longitudinal direction to dispose the limb 8 of the crank arm in the path of movement of the cage 10.

As far as I have proceeded it will be seen that when a longitudinal movement is given to the shaft 3 in one direction the crank arm 9 is moved to a position out of the path of movement of the cage 10; thus allowing the cage to pass without operating the shaft 3. It will be noted that when the cage reaches loading position under normal conditions the same will strike the crank arm 8 and rotate the shaft 3 for throwing the stops 1 to an open position and allowing a loaded car to pass onto the cage. For the purpose of preventing the succeeding loaded car from following and entering the cage, I provide the following mechanism:

This mechanism consists of a plate 11 of a predetermined area depending from the cage in a position to strike the limb 8. By making the plate 11 of the construction and size illustrated it will be seen that when the shaft 3 is given longitudinal movement and afterward the spring 7 allowed to expand the limb 8 will strike against the side of the plate as illustrated at 5 thereby preventing the crank arm 9 from completely returning to normal position under the cage. When the crank arm 9 is in the position illustrated in Fig. 5 the weight 5 has thrown the stops to a closed position thereby catching the following loaded car and holding the same against movement until the cage 10 again returns to loading position. An actuator is arranged to be operated by the loaded car passing onto the cage. This actuator consists of a bar 13 having crank arms 14 arranged at the ends thereof so as to be struck by the wheels of the car. At a central point this bar has fixed thereto a fork 15 moving between the collars 16 fixed to the shaft 3. At this point I wish to call attention to the fact that although I provide automatic means for giving longitudinal movements to the shaft 3, manually controlled means may be provided for accomplishing the same results.

It is to be understod that while all of the several features of my improved mechanism have special coöperation with one another and together constitute a particularly effective mechanism for the purpose in view, certain of these features may be applied in other relations, and I therefore desire to cover the combinations present in the several parts of my improved mechanism, whether employed in the general organization shown or elsewhere.

It is to be understood that the structural embodiment of the invention as a whole and its various features as shown is merely illustrative and not restrictive, since I am well aware that many of the details of construction can be widely varied without departing from the spirit of the invention. I therefore do not desire to be limited in these particulars or in any others, except as set forth in the appended claims.

In concluding my description I wish to call attention to the fact that certain parts of the invention may be manually operated and other parts automatically operated although I show in the drawings the complete apparatus constructed to be automatically operated throughout, and therefore I do not desire to be limited in any manner except as set forth in the appended claims.

Having described my invention what I claim is:

1. In combination with a cage, a car feeding apparatus comprising a pair of stops, mechanism for giving movements thereto in the movement of the cage and car operated means for moving the mechanism to a position not to be actuated by the cage.

2. In combination with a cage, car feeding mechanism comprising a pair of stops, mechanism for giving movements to the stops including a shaft, a connection between the shaft and cage whereby the shaft may be actuated upon movement of the cage and car operated means for destroying engagement between said connection and the cage.

3. In combination with a cage, car feeding apparatus comprising a pair of stops, mechanism for giving movements to the stops including a shaft mounted for rotatably as well as longitudinal movements, a crank arm connected to the shaft and normally lying to be engaged by the cage and car operated means for giving longitudinal movements to said shaft thereby moving the crank arm out of the path of movement of the cage.

4. In combination with a cage, car feeding apparatus comprising a pair of stops, mechanism for giving movements to the stops including a shaft mounted for rotatably as well as longitudinal movements, a crank arm connected to the shaft and normally lying to be engaged by the cage, car operated means for giving longitudinal movements to said shaft thereby moving the crank arm out of the path of movement of the cage, and a plate of a predetermined area for preventing return of the crank arm to normal position after the car actuated means have been released.

5. In combination with a cage, car feeding apparatus comprising a pair of stops a shaft mounted for rotatable as well as longitudinal movement, link connections between the stops and shaft, a crank arm associated with one end of the shaft a spring acting against the shaft for normally holding the crank arm in the path of movement of the cage, an actuator arranged to give longitudinal movement to the shaft and a plate depending from the cage in a position to engage the crank arm in the movement of the cage and further of an area to prevent complete return of the crank arm to normal position after the cage is in loading position and the shaft moved by the actuator.

6. In combination with a cage, car feeding apparatus comprising car stopping mechanisms constructed and arranged to be rendered inoperative for allowing the passage of a car when the cage is in normal position and rendered active substantially at the point of passage of the car onto the cage.

7. In combination with a cage, car feeding apparatus comprising car stopping mechanism including a pair of stops thrown to inoperative position through the engagement of the cage with the mechanism when the latter reaches unloading position, said mechanism being operated by a car to automatically force the stops back to operative position immediately upon the released car passing beyond the stops.

8. In combination with a cage, car feeding apparatus comprising car stopping mechanism constructed and arranged to be rendered inoperative for allowing the passage of a car when the cage is in normal position and rendered active by the passage of the car substantially at the point of passage of the car onto the cage.

9. In combination with a cage, car feeding apparatus comprising car stopping mechanism including a pair of stops thrown to inoperative position through the engagement of the cage with the mechanism when the latter reaches unloading position, said mechanism being constructed to automatically force the stops back to operative position immediately upon the released car passing beyond the stops, through the operation of the wheels of the passing car with a portion of the mechanism.

In testimony whereof I affix my signature.

JAMES A. NOLAN.